US010611291B2

(12) United States Patent
Kelly

(10) Patent No.: US 10,611,291 B2
(45) Date of Patent: Apr. 7, 2020

(54) LOCKING SYSTEM AND METHOD OF USE

(71) Applicant: Thomas P. Kelly, Colleyville, TX (US)

(72) Inventor: Thomas P. Kelly, Colleyville, TX (US)

( * ) Notice: Subject to any disclaimer, the term of this patent is extended or adjusted under 35 U.S.C. 154(b) by 0 days.

(21) Appl. No.: 16/192,297

(22) Filed: Nov. 15, 2018

(65) Prior Publication Data

US 2019/0143877 A1 May 16, 2019

Related U.S. Application Data

(60) Provisional application No. 62/586,456, filed on Nov. 15, 2017.

(51) Int. Cl.

| | |
|---|---|
| ***B60P 7/13*** | (2006.01) |
| ***B65D 90/00*** | (2006.01) |
| ***B65D 88/12*** | (2006.01) |
| *B61D 3/20* | (2006.01) |

(52) U.S. Cl.

CPC ................ *B60P 7/132* (2013.01); *B60P 7/13* (2013.01); *B65D 88/121* (2013.01); *B65D 90/002* (2013.01); *B61D 3/20* (2013.01); *B65D 2590/0033* (2013.01)

(58) Field of Classification Search

CPC .................. B60P 7/132; B65D 90/002; B65D 2590/0025; B65D 2590/0033

USPC ........................................................ 410/82

See application file for complete search history.

(56) References Cited

U.S. PATENT DOCUMENTS

| | | | | | |
|---|---|---|---|---|---|
| 3,389,663 | A * | 6/1968 | Gutridge | B61D 3/20 | 410/82 |
| 4,437,211 | A * | 3/1984 | Dorpmund | B60P 7/132 | 24/287 |
| 4,889,055 | A * | 12/1989 | Jamrozy | B61D 3/20 | 105/355 |
| 5,423,269 | A * | 6/1995 | Saxton | B61D 3/184 | 105/355 |
| 7,231,695 | B2 * | 6/2007 | Park | B65D 90/0013 | 220/23.4 |
| 7,942,601 | B2 * | 5/2011 | Bohman | B60P 7/132 | 220/1.5 |
| 9,011,055 | B1 * | 4/2015 | Royt | B65D 90/0006 | 410/84 |
| 2011/0180558 | A1 * | 7/2011 | Lanigan, Sr. | B60P 7/132 | 220/737 |

* cited by examiner

*Primary Examiner* — Hilary L Gutman

(74) *Attorney, Agent, or Firm* — Richard Eldredge

(57) ABSTRACT

A railcar locking system includes an elongated tower having an outer rail configured to engage with a lower railcar via a restrain cone; a locking arm extending from the elongated tower; a first locking cone secured to the locking arm and configured to engage with the lower railcar; and a second locking cone secure to the locking arm and configured to engage with an upper railcar.

1 Claim, 6 Drawing Sheets

LOCKING SYSTEM AND METHOD OF USE

BACKGROUND

1. Field of the Invention

The present invention relates generally to locking systems and methods of use. More specifically, the invention is related to a system and method to automatically connect and lock stacked containers which are transported by railcars.

2. Description of Related Art

Systems and methods for transporting containers in the railway intermodal industry is well known in the art. At times, it is required to transport containers that are configured in a double-stacked arrangement on railcars. The containers are loaded to and from the railcar using overhead gantry cranes or large forklift machines. For each railcar that is transporting double-stacked containers, it is necessary to manually lock the top container to the bottom container using connectors called inter box connectors or IBC's. This must be done before the railcar is able to be transported in the railway train. FIG. 1 depicts this commonly known process for connecting railcar containers via IBC. This process 101 includes a railcar worker 102 placing an IBC 103 at a specific location called a stacking post 104 on a bottom container 105, loading a top container 106 onto the bottom container, and the railcar worker manually connecting the top and bottom container by locking the IBC into place. This process is repeated at each of the four stacking post locations for every railcar that is transporting a set of double-stacked of containers.

The inter box connectors are manually operated. FIG. 2 depicts a commonly known IBC structure. The locking cones 201*a*,201*b* start in a neutral unlocked position, which allow them to be placed into the bottom container casting locations. The casting spacers 203 separate the locking cones from the locking lever 204 to allow for rotational movement. Once the bottom locking cone has been placed into the bottom container casting location, the top container is then loaded onto the bottom container. The top locking cone guides the top container into place. The worker then pulls the twist-lock lever or handle at each of the four stacking posts, which turns the top and bottom locking cones. This step engages the interior walls of the container castings and the top and bottom containers are now connected. The unlock cycle follows the same steps but in reverse.

One of the problems commonly associated with process 101 is the intensive manual labor and associated personnel safety risks. The IBCs must be manually placed at each of the four stacking post locations and then manually turned to engage the locking mechanism. This must be done for each of the railcars transporting double-stacked containers. The ground personnel must climb up several feet to the railcar platform. The 13 lb IBCs must be retrieved from their storage location and brought to the stacking post location. Oftentimes, this requires the workers to shuffle-step over 6 ft from the end of the railcar to the stacking post which is several feet off the ground.

Although great strides have been made in the area of intermodal railway transportation and methods of use, many shortcomings remain including liability risk of this manual process.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
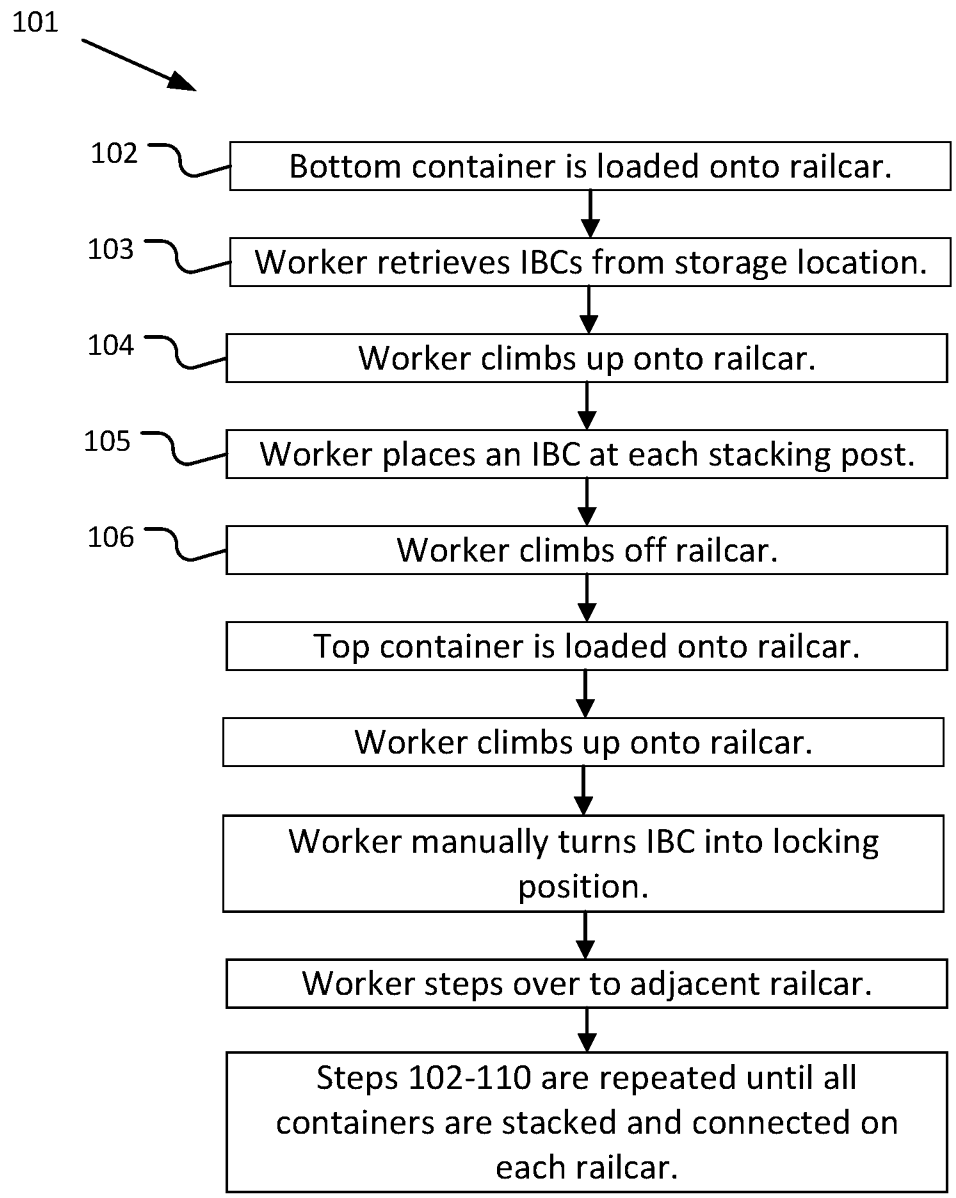
FIG. 1 is a flowchart of a conventional process of using inter box connectors to lock together a set of double stacked containers located on a railcar.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional systems and methods to transport stacked railcar containers. Specifically, the present invention is directed to an automated system that allows a locking mechanism to automatically connect a set of stacked containers located on a railcar for transport. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Referring now to the drawings wherein like reference characters identify corresponding or similar elements throughout the several views, FIGS. 3-6 depict various views of a system 401 in accordance with the preferred method of use of the present invention. It will be appreciated that system 401 overcomes one or more of the above-listed problems commonly associated with the conventional systems and methods to transport stacked containers on a railcar. The present invention may be referred to as a Container Automatic Restraint on Railcar System or CARRS.

In the contemplated embodiment, system 401 includes one or more of the same features as process 101; however, it is contemplated utilizing an automated locking system (see FIG. 4) housed in a set of railcar towers 407 configured to overcome the problems commonly associated with conventional interlocking process of railcar containers.

Figure 4:
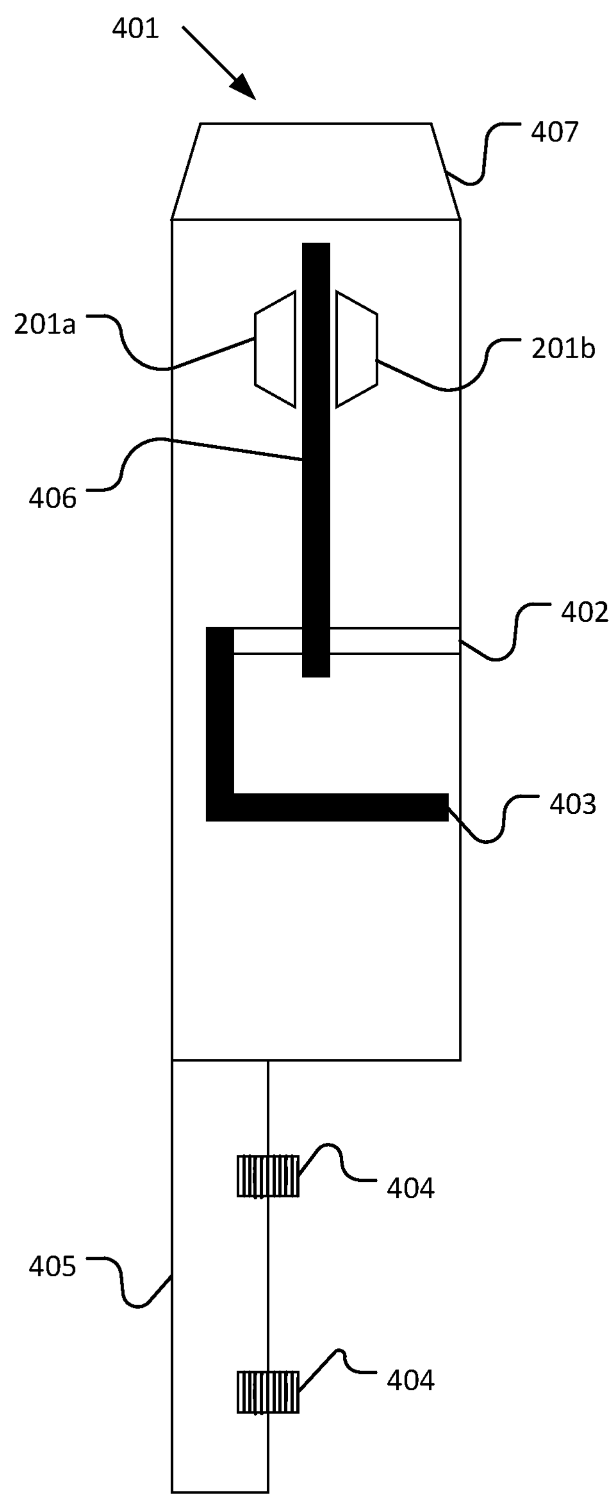
FIG. 4 is an internal side view of the locking mechanism housed inside the tower of the system of FIG. 3.

Referring now to FIG. 4, an internal side view of the towers 401 is shown having a body with three or more integral walls forming an inner cavity for housing the automated locking mechanism. The tower 407 further includes an elongated wall 405 configured with fasteners to be attached to the outer wall 506 of the railcar sidewall.

In one contemplated embodiment, the tower 407 could be composed of a rigid material, such as steel, which in turn facilitates for protection of the automated locking mechanism (FIG. 4) housed within the tower 407 and for attached to the rigid side wall 506 of the railcar.

In the illustrated embodiment, the inner wall of the elongated wall 405 has at least one fastener 404 secured thereto for securing the tower to the outer wall 506 of the railcar sidewall. It is contemplated that fastener 404 is a bolt or screw system or similarly suitable devices configured to secure to objects together. It will be appreciated that the fastener 404 is configured to retain the tower 407 in a fixed position during transport.

The preferred embodiment of the locking mechanism includes a set of locking cones 201*a*, 201*b* attached to a locking arm 406 located inside the cavity of the tower. The locking arm 406 is connected to a securing rod with a fastener that allows the locking arm to rotate downward at least 90 degrees. (see working position of FIG. 5) When the locking arm 406 is vertical, it is considered to be in the storage position. When the locking arm 406 is horizontal, it is considered to be in the working position. The locking arm 406 is connected to a locking arm actuator 503 via the securing rod 506. The upper part of the inner wall of the tower 407 comprises an opening through which the locking arm 406 is to be lowered. It is contemplated that the tower 407 could be retrofit onto existing railway cars or manufactured as a standard component of the railway car sidewall.

Figure 5:
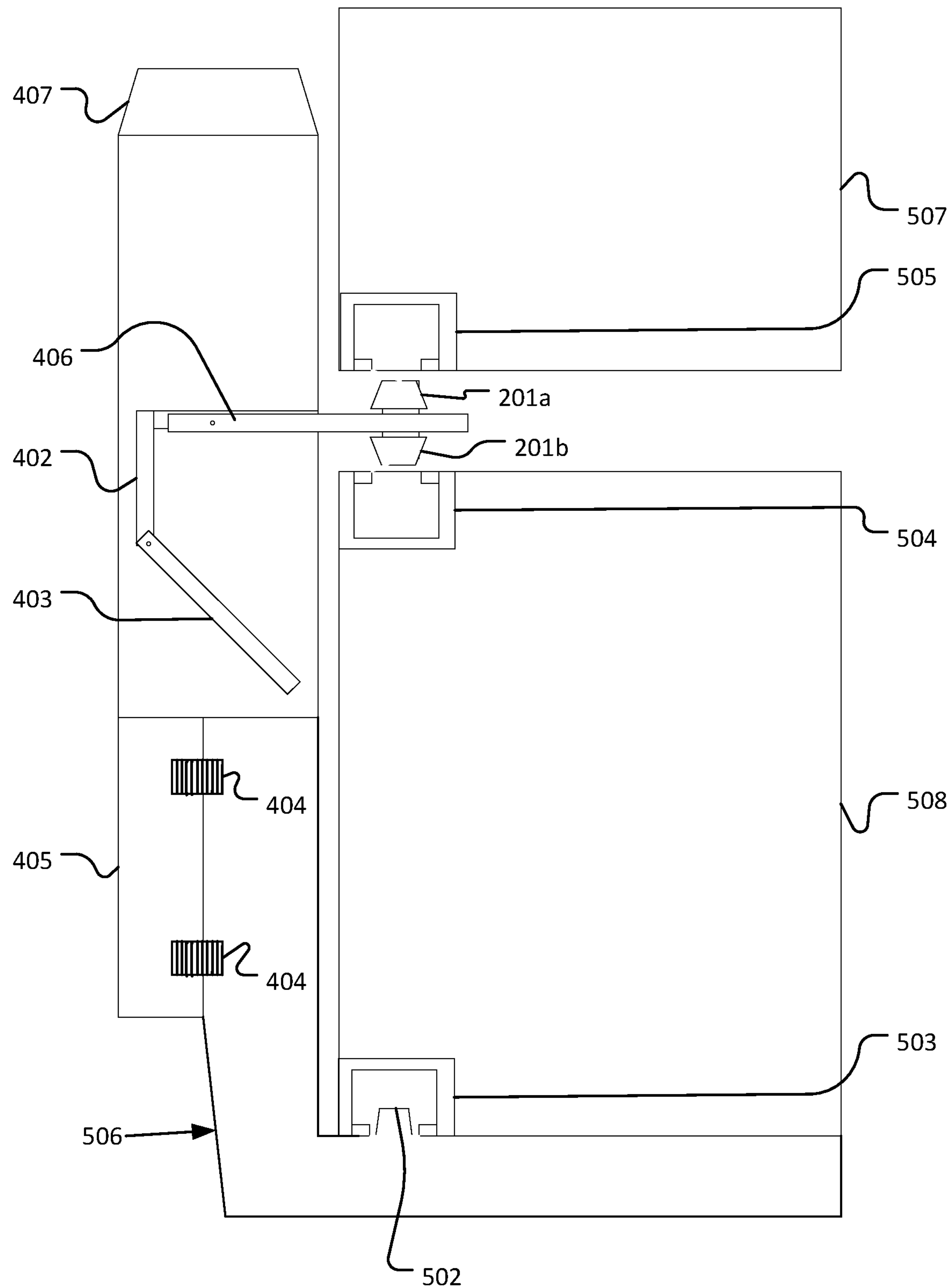
FIG. 5 is an internal side view of the interaction between the tower locking mechanism of FIG. 6 and the containers of the system of FIG. 1.

Referring now to FIG. 5, an internal side view of the interaction is shown between the tower locking mechanism of FIG. 4 and the containers of the system as described in FIG. 1. It is anticipated that a tower 407 will be installed at each of the conventional stacking posts of the railcar. A conventional railcar has four walls, wherein two walls are shorter and are configured to connect to the railcars located in front of and behind it in the train system. The remaining two walls are longer in length and are configured with higher side walls to provide lateral support for the cargo being transported. Two stacking posts are located on each higher side wall of the railcar. The towers will be installed similarly.

Figure 2:
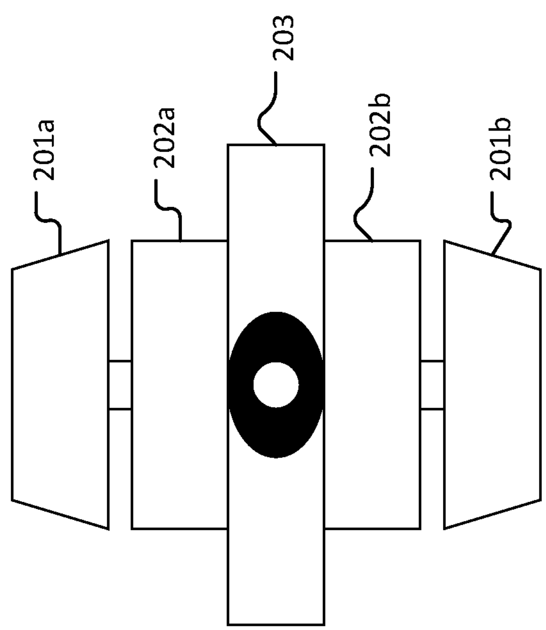
FIG. 2 is a front view of a system of a conventional inter box connector.
Figure 3:
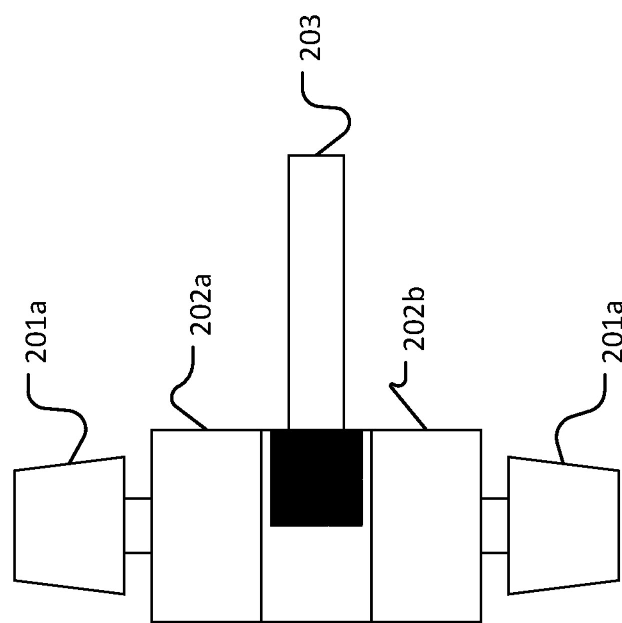
FIG. 3 is a side view of a system of a conventional inter box connector.

The bottom container 508 is loaded onto the railcar, wherein the container restraint cone 502 is secured into the floor casting 503. The locking arm 406 is seen in the working position and pivotally engaged with a first pivot arm 402 and second pivot arm 403 configured to pivot locking arm 406. In the contemplated embodiment, the locking arm 406 and pivot arms 402, 403 are disposed within an opening of tower 407. The bottom locking cones 201*b* are aligned with and located above the castings 504 located on the top edges of the bottom container. The top container 507 is loaded onto the bottom container 508, wherein the top locking cones 201*a* are aligned with the castings 505 located on the bottom edges of the top container 507. These locking cones 201*a*, 201*b* which are attached to the locking arm 406 are configured to automatically engage and disengage using spring action. These types of locks are readily available (see FIG. 2). It is anticipated that the inventor may incorporate such a lock as part of the present invention or incorporate a newly designed lock system. A locking arm actuator is used to assist the motion of the locking arm into and from the storage position to the working position.

Additionally, as part of the locking mechanism housed within the tower 401, the system will include an actuating pedal located on the floor or side of the railcar that will push or extend the locking arm into the proper position once the bottom container is loaded onto the railcar.

Figure 6:
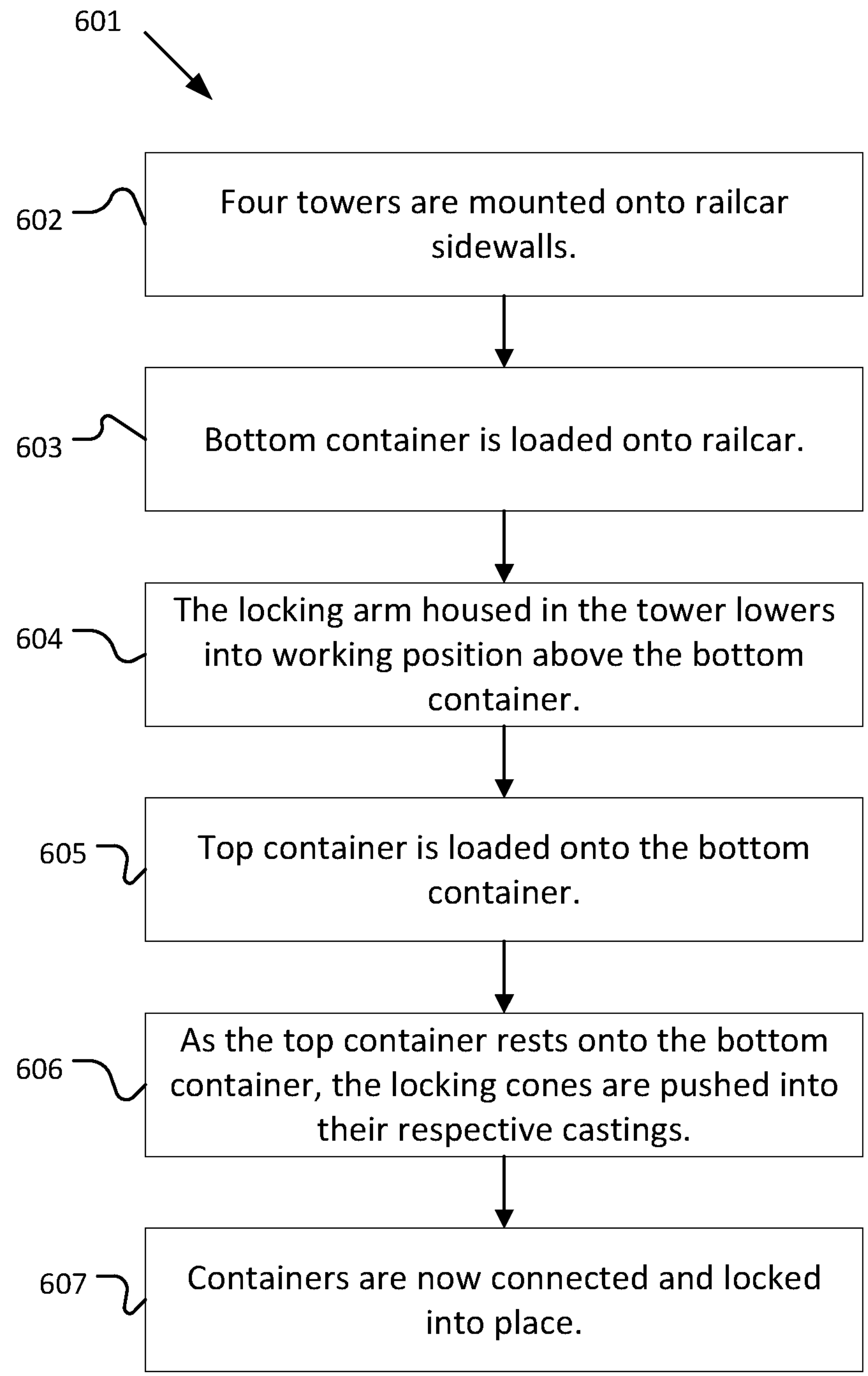
FIG. 6 is a flowchart depicting the preferred method of use of the present invention.

In FIG. 6, a flowchart 601 depicts the preferred method of use as shown in boxes 602-607. The method includes providing a tower 407 and automated locking mechanism as discussed above and securing the tower 407 to the railcar sidewall 304 via one or more fasteners 404. Thereafter, a bottom container 508 is loaded onto the railcar which engages the locking arm 406 to rotate from its stored position to its working position, wherein the bottom locking cones 201*b* are aligned with and located above the castings 505 located on the top edges of the bottom container. The top container 507 is then loaded onto the bottom container 508, wherein the top locking cones 201*a* are aligned with the castings 504 located on the bottom edges of the top container. As the top container 507 is lowered onto the bottom container 508, the top and bottom locking cones 201*a*, 201*b* are pushed into the castings 505, 504 of the top and bottom containers respectively. The double stacked containers are now securely connected and are ready for transport via the railway train.

Referring to FIG. 6, the method and system for disengaging the automated locking mechanism from the container castings follows the previous steps, but in reverse. As the top container is lifted off the bottom container, the locking cones are released from the castings. Once the top container is removed from above the bottom container, the locking mechanism arm retracts to allow the connectors to be stored within the tower. The area is now clear for the bottom container to be lifted off and removed from the railcar.

Advantages of the present invention over prior art include facilitating the automatic locking of a top container onto a bottom container and providing additional lateral support and restraint of the containers. CARRS is designed to be easily integrated onto existing railcars as a retrofit kit or as a component in the manufacturing process of railcars. The present invention is compatible with existing containers, including the loading and unloading process as associated with the containers.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A railcar locking system, comprising:

an elongated tower having:

an outer wall configured to engage with a lower container via a restrain cone;

a locking arm extending from the elongated tower;

a first locking cone secured to the locking arm and configured to engage with the lower container; and a second locking cone secure to the locking arm and configured to engage with an upper container.

* * * * *